(12) United States Patent
Tharpe, Jr.

(10) Patent No.: US 8,353,973 B2
(45) Date of Patent: *Jan. 15, 2013

(54) APPARATUS, SYSTEM, AND METHOD FOR PRODUCING BIO-FUEL UTILIZING CONCENTRIC-CHAMBERED PYROLYSIS

(76) Inventor: Johnny M. Tharpe, Jr., Albany, GA (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/361,743

(22) Filed: Jan. 29, 2009

(65) Prior Publication Data

US 2009/0282738 A1　Nov. 19, 2009

Related U.S. Application Data

(60) Provisional application No. 61/053,386, filed on May 15, 2008.

(51) Int. Cl.
*B23K 35/38* (2006.01)
(52) U.S. Cl. .................................. 48/197 FM; 48/197 R
(58) Field of Classification Search .................. None
See application file for complete search history.

(56) References Cited

U.S. PATENT DOCUMENTS

| | | | |
|---|---|---|---|
| 4,326,382 A | 4/1982 | Baardson |
| 4,414,813 A | 11/1983 | Knapp |
| 4,638,629 A | 1/1987 | Archer et al. |
| 5,341,637 A | 8/1994 | Hamrick |
| 5,471,937 A | 12/1995 | Kosky et al. |
| 5,513,444 A | 5/1996 | Lindberg |
| 5,626,638 A | 5/1997 | Valkanas |
| 5,666,890 A | 9/1997 | Craig |
| 7,272,934 B2 | 9/2007 | Chandran et al. |
| 2004/0020207 A1 | 2/2004 | Thiessen |
| 2006/0101663 A1 | 5/2006 | Perin et al. |
| 2006/0225424 A1 | 10/2006 | Elliott et al. |
| 2006/0254081 A1 | 11/2006 | Carin et al. |

FOREIGN PATENT DOCUMENTS

| | | |
|---|---|---|
| CA | 2441692 | 3/2005 |
| DE | 4342165 | 5/1995 |
| DE | 19729585 | 10/1998 |
| EP | 0165839 | 12/1985 |
| JP | 8-49822 | 2/1996 |
| WO | 2007113330 | 10/2007 |

*Primary Examiner* — Imran Akram
(74) *Attorney, Agent, or Firm* — Allen, Dyer, Doppelt, Milbrath & Gilchrist, P.A.

(57) ABSTRACT

An apparatus, system, and method for subjecting biomass to pyrolysis to extract energy products using a pyrolysis unit comprising generally concentric chambers including a combustion chamber and at least one pyrolysis chamber. Each chamber is in communication with an adjacent chamber such that a directed, generally-deoxygenated heated gas stream passes through the combustion chamber to each of the pyrolysis chambers in turn. Additionally, each pair of adjacent chambers shares a heat-conducting wall, further promoting heat transfer throughout the unit. A heat source, which can be a burn enclosure configured as part of the pyrolysis unit, produces the heated gas stream. Biomass introduced into the pyrolysis unit is pyrolysized by the gas stream, resulting in exhaust containing non-condensing gases, bio-oil vapor, and entrained char. The exhaust is directed from the pyrolysis unit to other parts of the system where the bio-oil and char can be separated from the exhaust and collected.

28 Claims, 4 Drawing Sheets

APPARATUS, SYSTEM, AND METHOD FOR PRODUCING BIO-FUEL UTILIZING CONCENTRIC-CHAMBERED PYROLYSIS

CROSS-REFERENCE TO RELATED APPLICATION

This application claims priority to provisional application 61/053,386, filed May 15, 2008, entitled System, Apparatus, and Method for Optimizing the Economical Production of Ecologically-Sound Energy Products from Biomass, Such as Sawmill Waste or Byproducts.

BACKGROUND

The present invention relates generally to systems, apparatus, and methods for the production of energy products from carbonizable material, such as biomass, particularly systems, apparatus, and methods that employ fast pyrolytic reactions.

Today, the United States faces substantial environmental issues from continuing reliance on polluting energy sources such as coal, natural gas, nuclear power, and hydroelectric power. The burning of fossil fuels, such as coal and natural gas, results in the emission of excessive amounts of carbon dioxide into the atmosphere. The use of nuclear power raises the specter of ecological damage through the accidental release of radiation into the environment, as well as difficulties in safely disposing of spent nuclear fuel. Hydroelectric projects can disrupt local ecosystems, resulting in major reductions in fish populations, negative impacts on native and migratory birds, and damage to the dammed river itself. As a result, people are looking for alternatives to these ecologically-harmful sources of energy. In recent years, biomass has gained popularity as an environmentally-sound alternative.

Biomass is commonly defined as living or recently-dead biological matter, generally vegetable matter. Biomass, or the fuel products derived from it, can be burned to produce power. Unlike fossil fuels, however, carbon dioxide released from the burning of biomass does not contribute to the overall carbon dioxide content of the atmosphere. This is true because biomass is part of the world's current atmospheric carbon cycle. For this reason, biomass is viewed as a renewable, carbon-neutral fuel.

Substantial sources of biomass are available from forest products processing facilities. The typical facility uses some of its biomass in the creation of its products, while the remainder of the biomass is seen as a byproduct. One type of forest products processor that produces a large volume of biomass byproduct is a chip mill. The chip mill processes only small-sized timber. In the chip mill, logs are debarked and then ground into chips for transporting to other mills for further processing. Another type of forest products processor is a chip and saw facility ("CNS facility"). A CNS facility produces dimensional lumber from timber that has a diameter ranging from mid-sized to small. Substantial sources of biomass are also available from other facilities, such as large log processing plants, plywood plants, and OSB plants, among others.

Throughout the year, a typical CNS facility will generate an average of more than five-hundred tons of dry biomass byproducts per day. (According to Marks Mechanical Engineering Handbook, the standard for "dry" is defined as twelve percent moisture content.) These biomass byproducts consist of white chips, bark, sawdust, and wood shavings. The white chips produced by a CNS facility are generally sold to paper-producing mills for processing into paper and cellulose products. The bark, sawdust, and shavings are either used at the CNS facility itself as a thermal energy source or sold as a byproduct. When sold as a byproduct, the biomass generally fetches less than twenty dollars a ton. This is far less than the value of its energy content, as shown by Table 1 below.

TABLE 1

Typical Production and Pricing of Biomass from a CNS facility

| Byproduct | Water Content | Daily Production | Value Per Ton | Energy Per Pound | Energy Val Per Ton * |
|---|---|---|---|---|---|
| Bark | 10% | 300 tons | $ 9.91 | 6,500 Btu | $224.91 |
| White Chips | 40% | 700 tons | $19.13 | 5,000 Btu | $173.00 |
| Sawdust | 40% | 120 tons | $13.00 | 5,000 Btu | $173.00 |
| Shavings | 10% | 120 tons | $24.50 | 8,666 Btu | $299.86 |

* The dollar value of the energy contained within a ton of a given type of biomass is based on a sale price of $100 for a 42-gallon barrel of crude oil having an energy content of 5,780,000 Btu.

One process used to produce energy products from biomass, and thus capture its energy content, is a process known as fast pyrolysis. Fast pyrolysis utilizes temperatures of between four-hundred-fifty and six-hundred degrees Celsius to rapidly heat biomass in the absence of oxygen. This results in the creation of three products: bio-oil, char, and non-condensing gases. All three products are combustible. The energy content of each of these products is listed in Table 2 below, along with the approximate percentage of each product typically yielded by the process.

TABLE 2

Energy Content of Products Produced by Fast Pyrolysis

| Product | Energy Content | % of Product Yielded |
|---|---|---|
| Bio-oil | 8,000 Btu per pound | 70.0% |
| Char | 12,000 Btu per pound | 14.3% |
| Non-condensing Gases | 4,000 Btu per pound | 13.4% |

Fuel needed to create and maintain such high temperatures in systems utilizing fast pyrolysis can represent a major operational expense. For this reason, it is recognized as desirable in the art to create systems that make the most of the heat they produce. There are a number of strategies used to accomplish this.

One strategy employs techniques meant to optimize the transfer of thermal energy to individual particles of biomass within a pyrolysis chamber. This can be accomplished through the use of organic heat carriers, like hot char, and inorganic heat carriers, like sand. These particularized heat carriers circulate within the pyrolysis chamber and radiate their heat to the particles of biomass. Other techniques involve rapidly moving particles of feedstock within a pyrolysis chamber so as to force the particles into nearly continual contact with the hot walls of the chamber. Still other techniques circulate a heated gas stream through a pyrolysis chamber to transfer heat to the particles of biomass. Another strategy involves capturing the hot exhaust resulting from pyrolytic reactions in the pyrolysis chamber and recirculating that hot exhaust to other parts of the system. Yet another more basic strategy involves simply insulating the pyrolysis chamber to deter heat loss through the walls of the chamber.

Given the desirability to make efficient use of the heat produced by systems employing fast pyrolysis to convert biomass into energy products, what is needed is a fast pyrolysis system that improves upon the conservation and reuse of a system's existing heat in a manner that is compatible with other recognized techniques for conserving and reusing the heat generated by the system.

BRIEF SUMMARY

In accordance with the present invention, an apparatus, system, and method are provided that employs a pyrolysis unit comprising concentric, or generally concentric, intercommunicating chambers for pyrolysizing biomass to create energy products. The pyrolysis unit captures and reuses heat that might otherwise be lost to the outside environment through the walls of a single-chambered unit. In addition, the unique, generally concentric construction of the intercommunicating chambers is compatible with other techniques used for conserving and reusing system-generated heat, such as the recirculation of hot exhaust resulting from pyrolytic reactions.

A pyrolysis unit embodying features of the present invention includes an elongated, tubular combustion chamber and at least one elongated, tubular pyrolysis chamber. The chambers are configured generally concentrically so that the combustion chamber is located substantially within the larger-diameter pyrolysis chamber. In embodiments including multiple pyrolysis chambers, each of the elongated, tubular pyrolysis chambers will be arranged with the combustion chamber in a generally concentric manner such that the combustion chamber is the innermost chamber, an inner pyrolysis chamber substantially surrounds the combustion chamber, and each successive pyrolysis chamber substantially surrounds a previous pyrolysis chamber.

One end of the combustion chamber is in communication with a proximate end of the pyrolysis chamber. In embodiments including multiple pyrolysis chambers, an opposite end of the innermost pyrolysis chamber is also in communication with a proximate end of a next-innermost pyrolysis chamber. An opposite end of the next-innermost pyrolysis chamber is, in turn, in communication with a proximate end of a successive pyrolysis chamber, and so on for each successive pyrolysis chamber. In this way, a directed, generally-deoxygenated, heated gas stream flowing from the combustion chamber flows through each pyrolysis chamber in turn. The heated gas stream reverses direction at each junction of chambers such that the stream flows in a first direction through one chamber, and then flows in a second direction opposite to the first direction through an adjacent chamber.

Each pair of adjacent chambers shares a common wall that separates the gas in each chamber while still conducting heat. For example, the wall of the combustion chamber and the inner wall of the inner pyrolysis chamber are both the same wall. In addition to heat radiating from the heated gas stream passing through the chambers, each common wall of the pyrolysis unit also conducts heat through itself from one chamber to the next. At the designed temperature of the combustion exhaust, the wall of the combustion chamber will also provide significant radiant heat transfer to the biomass flowing through the first pyrolysis chamber, thereby increasing the rate of heat transfer to the biomass.

A heat source is used to produce the directed, generally-deoxygenated, heated gas stream. In one embodiment, this heat source is a burn enclosure with an igniter and is configured as part of the pyrolysis unit. A fuel-air mixture is injected under pressure into a first end of the burn enclosure and ignited by the igniter. A second opposite end of the burn enclosure joins one end of a combustion chamber. The heated gas stream flows through the combustion chamber and out of the opposite end where it enters one or more pyrolysis chambers, each in turn. Alternate embodiments use other heat sources, such as a gas turbine in conjunction with a burn enclosure.

Biomass is introduced into the pyrolysis unit and pyrolysized by the generally-deoxygenated, combusted gas stream, resulting in the creation of primarily non-condensing gases and bio-oil vapor, along with entrained char. This exhaust and its entrained matter are collected from the pyrolysis unit and directed to other parts of the system where the bio-oil vapor and char are both separated from the exhaust and collected.

In some embodiments, a cyclone separator is used to separate entrained char from the exhaust. Also used in some embodiments is a biomass feed bin used to hold biomass for introduction into the pyrolysis unit. Exhaust separated from its bio-oil vapor and char is passed through the biomass feed bin whereupon the biomass acts as a filter, cleaning remaining entrained matter from the exhaust. Also in some embodiments, char separated from the exhaust is introduced back into the pyrolysis unit to aid in producing the generally-deoxygenated, heated gas stream.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION

Embodying the principles of the present invention is a system comprising a pyrolysis unit having concentric, or generally concentric, intercommunicating chambers in which biomass is pyrolysized to recover bio-oil and other products. A preferred embodiment of the system is depicted in FIGS. 1-4 and designated generally by reference numeral 10.

Figure 1:
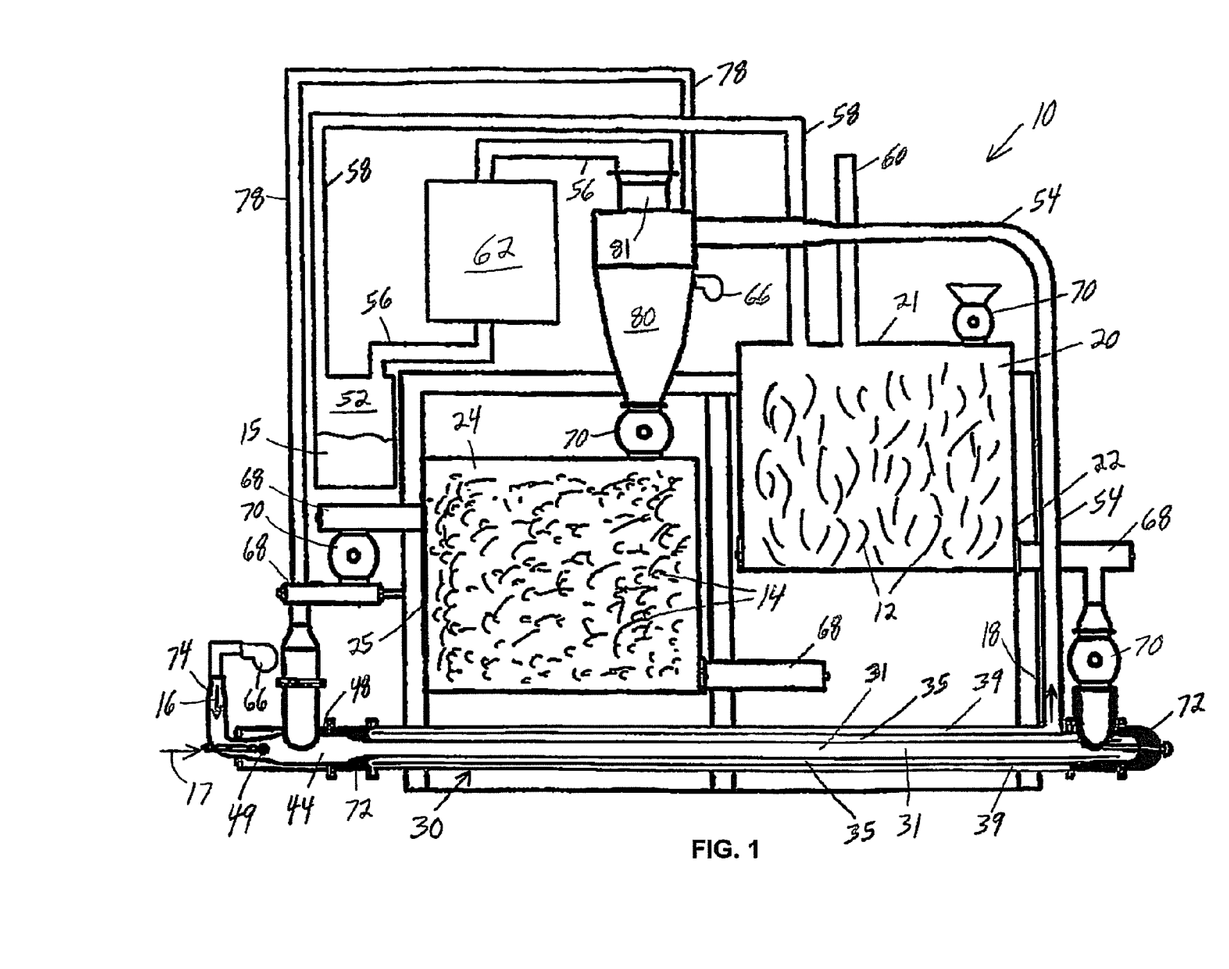
FIG. 1 is a schematic view of a concentric-chambered pyrolysis system, in accord with the present invention.

Referring now to FIG. 1, the concentric-chambered pyrolysis system 10 includes a biomass feed bin 20 for receiving and delivering biomass 12 that is to be pyrolysized. The biomass feed bin 20 is generally enclosed to provide greater control over the channeling of exhaust 18 (shown as an arrow) from pyrolytic reactions that is fed into the feed bin 20, as described below with reference to FIG. 1. The biomass 12 is fed through a top 21 of the feed bin 20 using a rotary air lock 70. The biomass 12 is delivered from the feed bin 20 by an auger 68 attached to a lower portion 22 of the biomass feed bin 20, as described below with reference to FIGS. 1 and 2. In this way, the biomass feed bin 20 continually cycles new biomass 12 through the system 10.

Continuing with FIG. 1, the biomass feed bin 20 accepts raw biomass 12. The present embodiment envisions receiving this biomass 12 primarily from sawmills, particularly chip and saw facilities. The biomass 12 will typically not need to be ground to a smaller size because it will already be of a size suitable for use in the system 10. If the biomass 12 does need to be ground, however, the biomass 12 will be ground prior to placing the biomass 12 in the biomass feed bin 20. Note that in the present embodiment, an optimal size for particles of biomass 12 used in the concentric-chambered pyrolysis system 10 are envisioned to be particles 12 having no side generally greater than one-quarter inch in length. In alternate embodiments, however, items of biomass 12 having substantially larger dimensions are possible. Note also that in the present embodiment, items of biomass 12 are envisioned to consist generally of wood chips, sawdust, bark, wood shavings, and the like. Note further that in alternate embodiments, the use of biomass 12 of varying types received from numerous different sources is possible. Note in addition that in other alternate embodiments, carbonizable material other than just biomass can be used as input to the system 10.

Still referring to FIG. 1, some biomass 12 fed into the system 10 might require drying prior to undergoing pyrolysis. Biomass 12 with a moisture content of approximately fifteen percent or less by weight can be subjected to pyrolysis without prior drying. Green biomass 12, however, will generally have a moisture content of about fifty percent by weight, as opposed to dry biomass 12 that generally will have a moisture content of about ten percent. The green biomass 12 can be blended with the drier biomass 12 to achieve a combined moisture content of fifteen percent or less. If such blending of the biomass 12 is insufficient to achieve a fifteen percent moisture content by weight, then the biomass 12 will need to be dried prior to subjecting the biomass 12 to pyrolysis. Optimally, the biomass 12 subjected to pyrolysis will have a moisture content of no more than twelve percent by weight. Note that in some cases the biomass 12 could be too dry, in which case moisture might need to be added.

Figure 2:
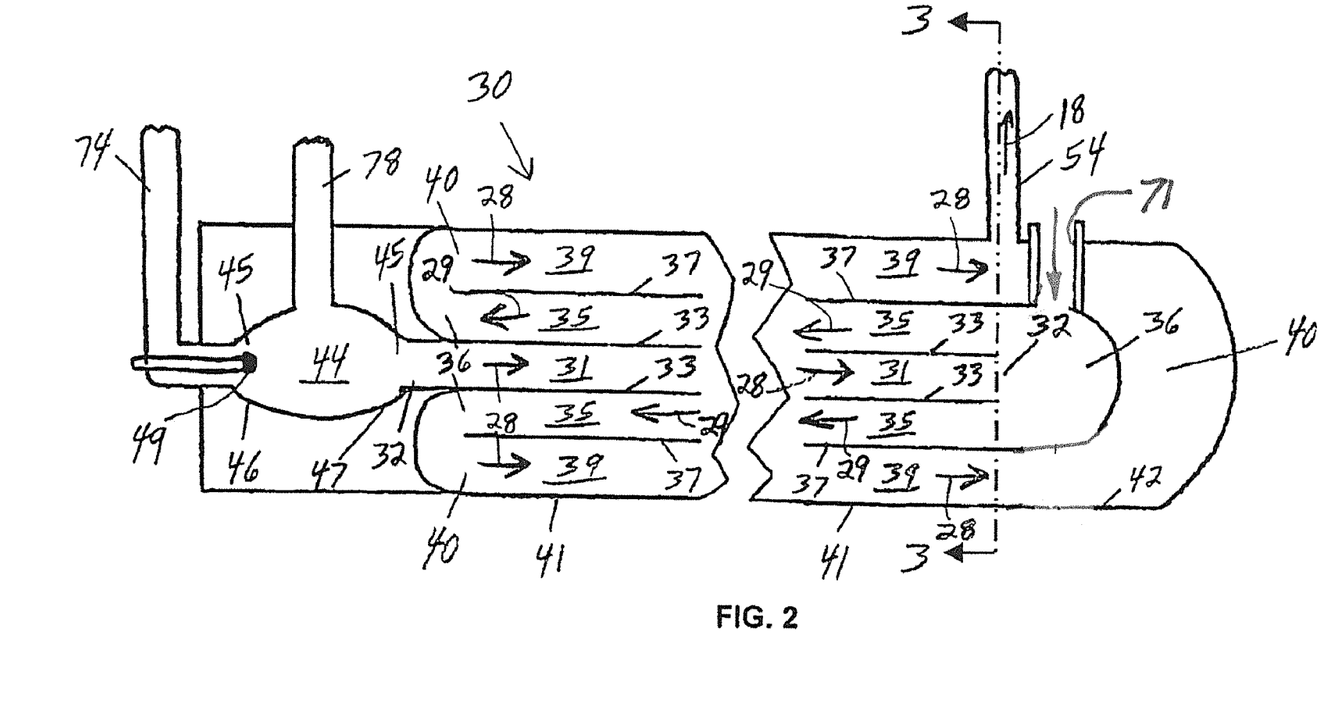
FIG. 2 is a schematic view of a pyrolysis unit used in the concentric-chambered pyrolysis system of FIG. 1.

Referring now to FIG. 2, the concentric-chambered pyrolysis system 10 also includes a pyrolysis unit 30. The pyrolysis unit 30 is made up of a burn enclosure 44, an igniter 49, a combustion chamber 31, an inner pyrolysis chamber 35, and an outer pyrolysis chamber 39. The burn enclosure 44 is in the general shape of an elongated tube open at opposing ends 45. A fuel-air input duct 74 is attached to the end 45 of a forward portion 46 of the burn enclosure 44, while the igniter 49 is attached proximate to the end 45 of the forward portion 46. Insulation 72 (see FIG. 1) is installed around the burn enclosure 44 to reduce the amount of heat lost to the surrounding environment.

Continuing with FIG. 2, the combustion chamber 31, the inner pyrolysis chamber 35, and the outer pyrolysis chamber 39 are each also in the general shape of an elongated tube, with the three chambers 31, 35, 39 arranged generally concentrically. The combustion chamber 31 is innermost, the inner pyrolysis chamber 35 surrounds the combustion chamber 31, and the outer pyrolysis chamber 39 is outermost, surrounding both the combustion chamber 31 and the inner pyrolysis chamber 35. An end 45 of a rearward portion 47 of the burn enclosure 44 is connected to a proximate end 32 of the combustion chamber 31, while an opposing distal end 32 of the combustion chamber 31 extends into but is not attached to a proximate end 36 of the inner pyrolysis chamber 35. An opposing distal end 36 of the inner pyrolysis chamber 35 extends into but is not attached to a proximate end 40 of the outer pyrolysis chamber 39.

Regarding FIG. 2, note that in alternate embodiments it is possible for a pyrolysis unit 30 to comprise as few as two chambers, for example a combustion chamber 31 and a pyrolysis chamber. In other alternate embodiments, it is possible that a pyrolysis unit 30 will have additional chambers, for example chambers in addition to a combustion chamber 31, an inner pyrolysis chamber 35, and an outer pyrolysis chamber 39. Note also that the inventor recognizes that chambers of a pyrolysis unit can be arranged in a generally eccentric configuration, as opposed to a generally concentric configuration, even though it is likely that the eccentric configuration would be less efficient.

Figure 3:
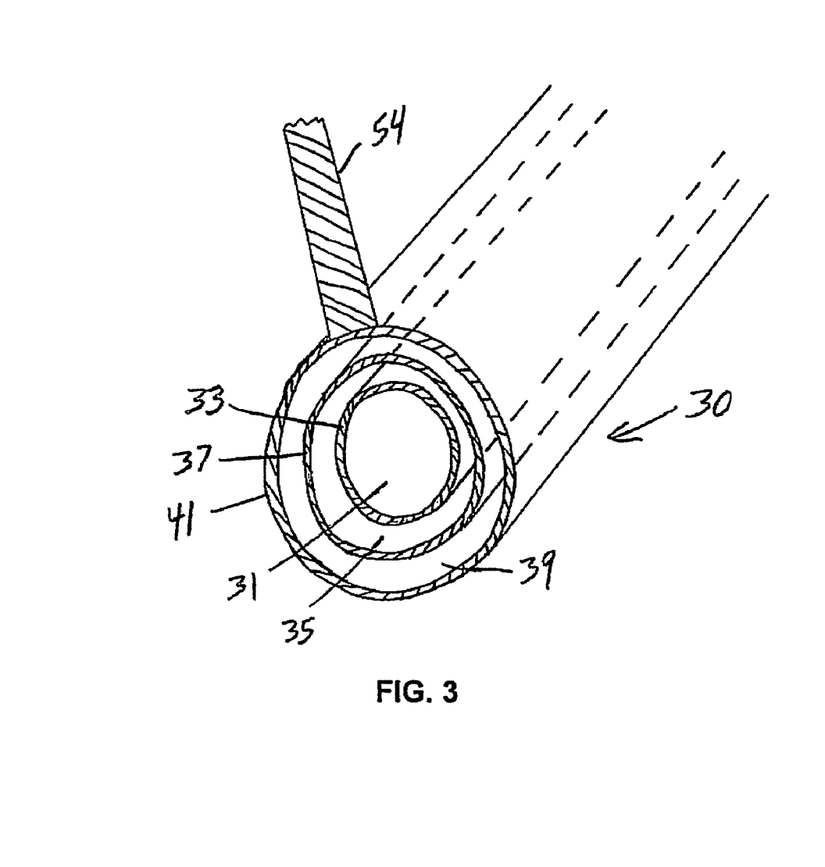
FIG. 3 is a cross-sectional perspective view of FIG. 2, taken along line 3-3.

Referring now to FIG. 3, each of the three chambers 31, 35, 39 of the pyrolysis unit 30 shares a wall 33, 37 with one other chamber 31, 35, 39. A common wall 33 forms the wall 33 of the combustion chamber 31 as well as the inner wall 33 of the inner pyrolysis chamber 35. Another common wall 37 forms the outer wall 37 of the inner pyrolysis chamber 35 and also the inner wall 37 of the outer pyrolysis chamber 39. In this way, the three chambers 31, 35, 39 function as a heat exchanger, promoting heat transfer in three ways. First, conductive heat transfer through the common walls 33, 37 of the chambers 31, 35, 39. Second, concurrent flow heat transfer is effected by the combusted gas stream 28, 29 (shown as arrows in FIG. 2) and char 14 to the biomass undergoing pyrolysis, as described below with reference to FIGS. 1 and 2. Third, countercurrent flow heat transfer is effected by the gas stream 28, 29 flowing throughout the chambers 31, 35, 39. Insulation 72 (see FIG. 1) is installed adjacent an interior surface 42 (see FIG. 2) of an outer wall 41 of the pyrolysis unit 30 to reduce the amount of heat lost to the surrounding environment. Note that the generally concentric configuration of the pyrolysis unit 30 allows for reuse of heat that would otherwise be lost to the surrounding environment through an outer wall of a single-chambered pyrolysis unit.

Referring now to FIG. 1, fuel 17 (shown as an arrow), along with outside air 16 (shown as an arrow) propelled by a blower 66, are introduced into the burn enclosure 44 under pressure through the fuel-air input duct 74. Combustion of the fuel-air 17, 16 mixture produces heat and removes oxygen from the burn enclosure 44 and the attached combustion chamber 31. Note that a variety of fuels 17 can be used for this purpose, such as fuel oil or bio-oil 15.

Continuing with FIG. 1, the char 14 along with air 16 are also introduced into the burn enclosure 44. The air 16 need not necessarily be preheated. The char 14 is fed from a char bin 24 by a first auger 68 attached to a middle portion 25 of the char bin 24. The first auger 68 conveys the char 14 out of the char bin 24 and into a proximate rotary air lock 70. A second auger 68 receives the char 14 from the rotary air lock 70 and delivers the char 14 into a char-air input duct 78 that leads into the burn enclosure 44. The preheated air 16 comes from a cooling duct 83 (see FIG. 4) of a cyclone separator 80 that is used to separate entrained char 14 from the exhaust 18 (shown as an arrow) of previous pyrolytic reactions, as described below with reference to FIG. 4. The cooling duct 83 connects to the char-air input duct 78 to convey the preheated air 16 to the burn enclosure 44. An end of the char-air input duct 78 is attached to a top 48 of the burn enclosure 44. The char-air 14, 16 mixture exits the end of the duct 78 and enters the burn enclosure 44 through the top 48. Note that a key function of the char-air 14, 16 mixture is to burn off any excess oxygen that would otherwise remain in the burn enclosure 44 and combustion chamber 31 following combustion of the fuel-air 17, 16 mixture.

Still referring to FIG. 1, the igniter 49 ignites the fuel-air 17, 16 mixture. The ignited fuel-air 17, 16 mixture, in turn, ignites the char-air 14, 16 mixture. Combustion begins generally in the burn enclosure 44 and continues into the combustion chamber 31 where the fuel-air 17, 16 and char-air 14, 16 mixtures are substantially fully combusted. Note that although it is preferable that all of the oxygen remaining in the burn enclosure 44 and combustion chamber 31 be consumed, it is not required. Note also that feeding of the fuel-air 17, 16 and char-air 14, 16 mixtures, along with ignition of the mixtures, is done in a continual sequence during system 10 operation.

Continuing with FIG. 1, to burn off any excess oxygen that would otherwise remain in the burn enclosure 44 and combustion chamber 31 following ignition of the fuel-air 17, 16 mixture requires that a certain minimum amount of char 14 be present in the burn enclosure 44. During typical system 10 operation, however, more than this minimum amount of char 14 is introduced into the burn enclosure 44. This results in excess char 14 being present in the combustion chamber 31 following combustion of the fuel-air 17, 16 and char-air 14, 16 mixtures. Individual particles of this excess char 14 are greatly heated by the combustive reaction. These particles of excess char 14 radiate heat to their surroundings as the char 14 travels through the combustion 31, inner pyrolysis 35, and outer pyrolysis chambers 39. Eventually, the excess char 14 becomes entrained within exhaust 18 of a new pyrolysis reaction, with the excess char 14 mixing with newly-pyrolysized char 14, as described below with reference to FIGS. 1 and 2. Note that in alternate embodiments, a gas turbine can be used as a combustion source for providing heat and deoxygenation in addition to, or in place of, a burn enclosure 44.

Referring now to FIG. 2, the substantially deoxygenated, continuous heated gas stream 28, 29 (shown as arrows) produced from the continual combustion of the fuel-air 17, 16 and char-air 14, 16 mixtures (see FIG. 1) flows out of the rearward portion 47 of the burn enclosure 44 and throughout the combustion chamber 31. The continual production of the heated gas stream 28, 29 from the burn enclosure 44 and the combustion chamber 31, together with an impetus provided by injection of the fuel-air 17, 16 mixture into the burn enclosure 44 under pressure, propels the heated gas stream 28, 29 in a first direction 28 through the combustion chamber 31 and into the inner pyrolysis chamber 35. In the inner pyrolysis chamber 35, the heated gas stream 28, 29 changes to a second direction 29 that is opposite to that of the first direction 28 of the stream 28, 29 through the combustion chamber 31. The heated gas stream 28, 29 exits the distal end 36 of the inner pyrolysis chamber and enters the outer pyrolysis chamber 39. In the outer pyrolysis chamber 39, the stream 28, 29 changes back to the first direction 28, which is opposite to that of the second direction 29 of the stream 28, 29 through the inner pyrolysis chamber 35.

Continuing with FIG. 2, in addition to heat radiating from the flow of the heated gas stream 28, 29 through the pyrolysis unit 30, heat from the heated gas stream 28, 29 is also conducted among the three generally concentric chambers 31, 35, 39 through the common walls 33, 37 of the three chambers 31, 35, 39. In this way, the chambers 31, 35, 39 operate as a countercurrent flow heat exchanger. Note that the temperature of the combustion chamber 31 during operation of the system 10 is typically in excess of six-hundred-fifty degrees Celsius.

Referring now to FIGS. 1 and 2, biomass 12 (see FIG. 1) is fed from the biomass feed bin 20 (see FIG. 1) by the auger 68 (see FIG. 1) attached to the lower portion 22 (see FIG. 1) of the biomass feed bin 20. The auger 68 conveys the biomass 12 out of the feed bin 20 and into a proximate rotary air lock 70 (see FIG. 1). The rotary air lock 70, in turn, introduces the biomass 12 into the pyrolysis unit 30 at the distal end 32 (see FIG. 2) of the combustion chamber 31 through port 71, where the combustion chamber 31 is in communication with the proximate end 36 (see FIG. 2) of the inner pyrolysis chamber 35.

Continuing with FIGS. 1 and 2, the continuous heated gas stream 28, 29 (shown as arrows in FIG. 2) captures the biomass 12 in its flow and carries the biomass 12 along through the inner pyrolysis chamber 35 toward the distal end 36 (see FIG. 2) of the inner pyrolysis chamber 35, opposite the proximate end 36 of the inner pyrolysis chamber 35 where the biomass 12 entered. As the heated gas stream 28, 29 moves the biomass 12 along, heat radiating from the stream 28, 29 fast pyrolysizes the biomass 12. (Optimally, pyrolysis of a particle of biomass 12 takes no more than two seconds.) Exhaust 18 (shown as an arrow) resulting from the pyrolytic reaction comprises primarily non-condensing gases (not shown), bio-oil vapor (bio-oil not shown in vapor form), and entrained char 14 (see FIG. 1). Note that the non-condensing gases are substantially made up of carbon dioxide, carbon monoxide, and nitrogen. Note also that the entrained char 14 might include excess, non-combusted char 14 from the char-air 14, 16 mixture (see FIG. 1) that was introduced into the burn enclosure 44, as described above with reference to FIG. 1. Note further that in alternate embodiments, various forms of inert material might be employed to assist in the transfer of heat to biomass that is to be pyrolysized.

Still referring to FIGS. 1 and 2, the exhaust 18 from the pyrolytic reaction, along with any remaining non-pyrolysized biomass 12, reaches the distal end 36 of the inner pyrolysis chamber 35, where the inner pyrolysis chamber 35 communicates with the proximate end 40 (see FIG. 2) of the outer pyrolysis chamber 39. As the exhaust 18 and remaining biomass 12 enter the outer pyrolysis chamber 39, the exhaust 18 and remaining biomass 12 change from flowing in the second direction 29 (see FIG. 2) to flowing in the first direction 28 (see FIG. 2) opposite to that of the second direction 29. As the remaining non-pyrolysized biomass 12 is swept through the outer pyrolysis chamber 39, the remaining biomass 12 is fast pyrolysized by heat from the gas stream 28, 29. Exhaust 18 from this pyrolytic reaction combines with the existing exhaust 18 in the outer pyrolysis chamber 39. Note that in some instances it is possible that a small quantity of oxygen will remain in one or both of the pyrolysis chambers 35, 39 at the time of pyrolysis. In this event, a small amount of the biomass 12 will react with the oxygen and combust rather than pyrolysize. This limited amount of combustion does not present a significant problem, although it might reduce the efficiency or yield of the pyrolysis unit 30 somewhat.

Continuing with FIGS. 1 and 2, an exhaust duct 54 is fitted to the pyrolysis unit 30 proximate the distal end 40 (see FIG. 2) of the outer pyrolysis chamber 39, opposite the proximate end 40 of the outer pyrolysis chamber 39 where the outer pyrolysis chamber 39 communicates with the inner pyrolysis chamber 35. The exhaust 18 exits the outer pyrolysis chamber 39 and rises along the exhaust duct 54. The exhaust duct 54 leads from the pyrolysis unit 30 and attaches to the cyclone separator 80 (see FIG. 1), as described below with reference to FIG. 4.

Figure 4:
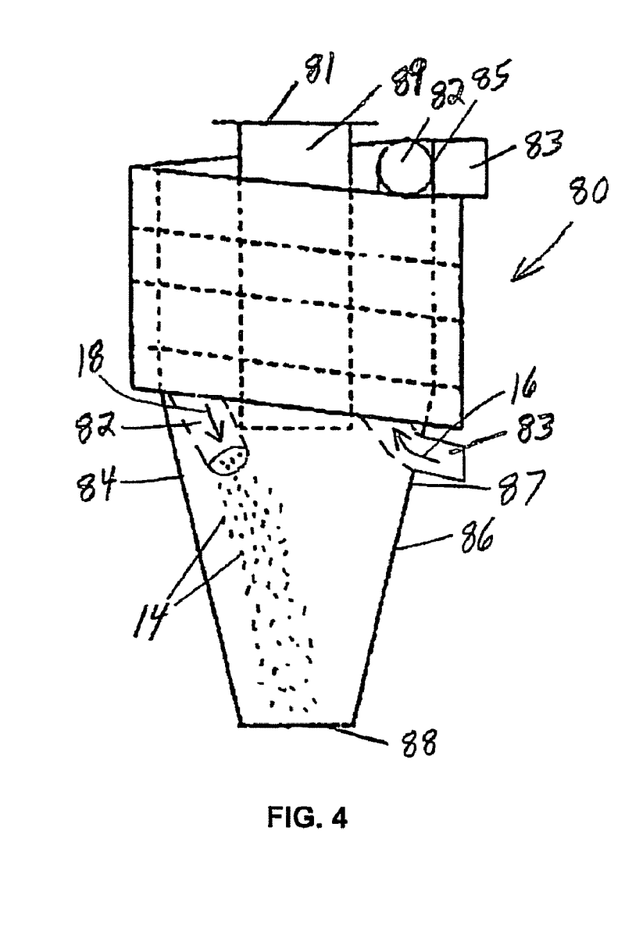
FIG. 4 is a schematic view of a cyclone separator used in the concentric-chambered pyrolysis system of FIG. 1.

Referring now to FIG. 4, the cyclone separator 80 comprises a body 84 with a collection cone portion 86, a central exhaust pipe 81, an inflow pipe 82, and the cooling duct 83. The collection cone portion 86 is in the general shape of a cone having an upwardly facing mouth 87 and an opposing open end 88 for collecting and distributing char 14 separated from the exhaust 18 (shown as an arrow) of pyrolysis reactions. The exhaust pipe 81 resides in the approximate center of the body 84 with the collection cone portion 86 located beneath a lower end of the exhaust pipe 81. The exhaust pipe 81 is used for carrying the exhaust 18 out of the cyclone separator 80 following separation of the entrained char 14 from the exhaust 18. The inflow pipe 82 and cooling duct 83 are aligned parallel with each other and share a common wall 85, with the inflow pipe 82 located inwardly of the cooling duct 83. The common wall 85 promotes heat transfer from the exhaust 18 in the inflow pipe 82 to the cooler air 16 in the cooling duct 83. The inflow pipe 82 and cooling duct 83 spiral downwardly together around the central exhaust pipe 81, beginning near an upper portion 89 of the exhaust pipe 81 and descending to a point just above the mouth 87 of the collection cone portion 86.

Continuing with FIG. 4, the exhaust duct 54 (see FIG. 1) connects to an end of the inflow pipe 82 that is near the upper portion 89 of the central exhaust pipe 81. The cyclone separator 80 draws the exhaust 18 downwardly through the inflow pipe 82 toward the mouth 87 of the collection cone portion 86. A blower 66 (see FIG. 1) is attached to an end of the cooling duct 83 that is near the mouth 87 of the collection cone portion 86. The blower 66 forces outside air 16 (shown as an arrow) upwardly through the cooling duct 83. The cooler outside air 16 inside the cooling duct 83 absorbs some of the heat of the hotter exhaust 18 inside the inflow pipe 82 through the common wall 85 between the inflow pipe 82 and the cooling duct 83, thereby heating the air 16 and cooling the exhaust 18. The char-air input duct 78 (see FIG. 1) connects to an opposing end of the cooling duct 83 that is near the upper portion 89 of the exhaust pipe 81. The now-heated air 16 flows through the char-air input duct 78 until the air 16 is eventually vented into the burn enclosure 44 along with the char 14 to be combusted, as described above with reference to FIG. 1. Note that in alternate embodiments, preheated air 16 from a cooling duct 83 is routed to a fuel-air input duct 74 or to both a char-air input duct 78 and a fuel-air input duct 74.

Still referring to FIG. 4, as the exhaust 18 spirals downwardly through the inflow pipe 82 toward the mouth 87 of the collection cone portion 86, centrifugal force drives the particles of char 14 entrained within the exhaust 18 toward the common wall 85 between the inflow pipe 82 and the cooling duct 83. As the particles of char 14 exit the end of the inflow pipe 82, the char 14 falls into the mouth 87 of the collection cone portion 86 and exits the open end 88 of the collection cone portion 86. Connected to the open end 88 is a rotary air lock 70 (see FIG. 1). The rotary air lock 70 feeds the char 14 into the char bin 24 (see FIG. 1).

Continuing with FIG. 4, a given amount of the char 14 from the char bin 24 will be fed into the burn enclosure 44, as described above with reference to FIG. 1. Since the char bin 24 is continually filling with char 14 from the cyclone separator 80, it is possible that some amount of the char 14 will also need to be removed from the char bin 24 to keep the char bin 24 from overflowing. This excess char 14 is removed as an end product of the system 10.

Still referring to FIG. 4, at this point substantially all of the char 14 will have been removed from the exhaust 18. The substantially char-free exhaust 18 now principally comprises non-condensing gases (not shown) and bio-oil vapor (bio-oil not shown in vapor form). This generally char-free exhaust 18 flowing from the end of the inflow pipe 82 rises and exits the cyclone separator 80 through an end of the upper portion 89 of the central exhaust pipe 81 and enters a second exhaust duct 56 (see FIG. 1) attached to the end of the upper portion 89.

Referring now to FIG. 1, the exhaust duct 56 transports the exhaust 18 (shown as an arrow) through a bio-oil condensing system 62 that cools the exhaust 18 to a temperature of below one-hundred degrees Celsius. At this temperature, substantially all of the bio-oil vapor (bio-oil not shown in vapor form) condenses out of the exhaust 18 while the non-condensing gases (not shown) in the exhaust 18 remain in a gaseous state. The exhaust duct 56 leads from the bio-oil condensing system 62 to a bio-oil storage tank 52. The now-liquid bio-oil 15 and the bio-oil-free exhaust 18 empty into the bio-oil storage tank 52. The liquid bio-oil 15 collects in the storage tank 52 and is dispensed from the tank 52 as an end product of the system 10.

Continuing with FIG. 1, a third exhaust duct 58 leads from the bio-oil storage tank 52 to the biomass feed bin 20. The biomass feed bin 20 is generally enclosed to provide greater control over the channeling of the exhaust 18 fed into the feed bin 20, as described above with reference to FIG. 1. The exhaust 18 leaves the third exhaust duct 58 and passes through the biomass feed bin 20. The biomass 12 in the feed bin 20 acts as a filter for the exhaust 18, filtering out of the exhaust 18 any liquid or solid matter still entrained. The non-condensing gases of the exhaust 18 then exit the biomass feed bin 20 through an exhaust vent 60 leading to the outer environment. Note that in alternate embodiments, an exhaust vent 60 is attached to a char-air input duct 78 to channel a portion of the cleansed non-condensing gases exiting a biomass feed bin 20 into a burn enclosure 44 to join char 14 that is to be combusted, as described above with reference to FIG. 1.

Figure 5:
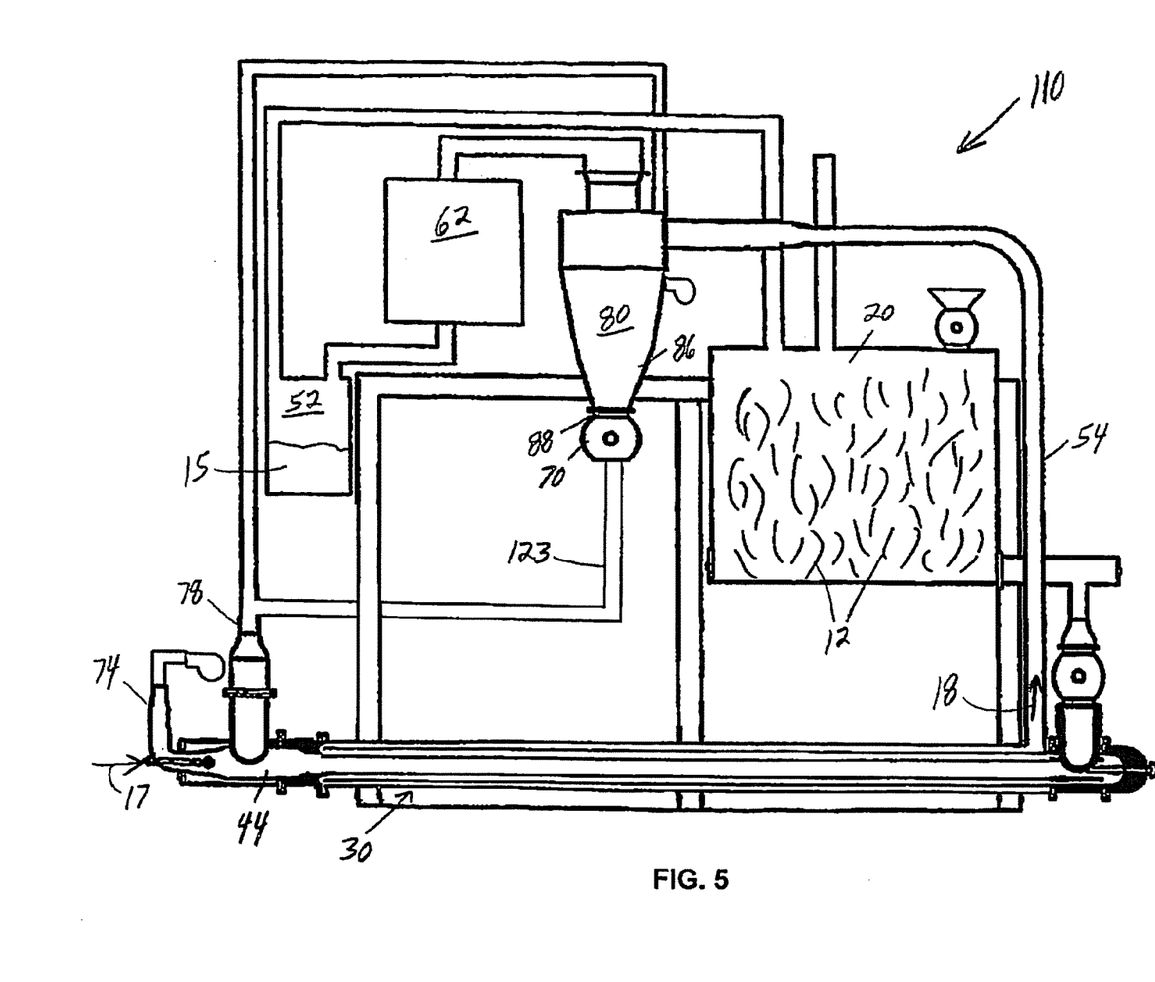
FIG. 5 is a schematic view of a second embodiment of a concentric-chambered pyrolysis system, in accord with the present invention.

FIG. 5 depicts a second preferred embodiment of a concentric-chambered pyrolysis system, designated generally by reference numeral 110, in accordance with the present invention. In the present embodiment, substantially an entire amount of char 14 produced from pyrolytic reactions in a pyrolysis unit 30 is fed back into the system 110 to help fuel further pyrolytic reactions.

Referring now to FIG. 5, as particles of char 14 (see FIG. 4) exit an open end 88 of a collection cone portion 86 of a cyclone separator 80, the char 14 enters a rotary air lock 70 attached to the open end 88. The rotary air lock 70 feeds the char 14 directly into a char feed duct 123. The char feed duct 123 leads to a char-air input duct 78. The char-air input duct 78, in turn, leads to a burn enclosure 44 of a pyrolysis unit 30. In this way, virtually all of the char 14 produced from pyrolysized biomass 12 is fed back into the system 110 and used to power further fast pyrolytic reactions. Additional fuel 17 (shown as an arrow), such as fuel oil or bio-oil 15, is added to the burn enclosure 44 as needed to ensure the system 110 continues to effect efficient fast pyrolytic reactions.

Regarding FIG. 5, note that unlike the concentric-chambered pyrolysis system 10 of the first preferred embodiment (see FIGS. 1-4), the system 110 of the present embodiment does not require a char bin 24 or augers 68 to convey char 14 from the char bin 24 to the char-air input duct 78.

While the invention has been described with respect to certain specific embodiments, it will be appreciated that many modifications and changes may be made by those skilled in the art without departing from the spirit of the invention. It is intended, therefore, that the appended claims cover all such modifications and changes as fall within the true spirit and scope of the invention.

What is claimed as new and what it is desired to secure by Letters Patent of the United States is:

1. A method for subjecting biomass to pyrolysis to extract bio-fuel therefrom, the method comprising the steps of:
provid­ing a pyrolysis unit having a burn enclosure with an igniter, a combustion chamber, an inner pyrolysis chamber, and an outer pyrolysis chamber, the chambers arranged generally concentrically such that the combustion chamber is innermost substantially surrounded by the inner pyrolysis chamber which is substantially surrounded by the outer pyrolysis chamber, a first proximate end of the combustion chamber extending from and in communication with an end of a rearward portion of the burn enclosure, and a second distal end of the combustion chamber in communication with a first proximate end of the inner pyrolysis chamber, and a second distal end of the inner pyrolysis chamber in communication with a first proximate end of the outer pyrolysis chamber;

injecting an admixture of air and fuel under pressure into the burn enclosure and igniting the admixture to facilitate combustion of the admixture in a first direction through the combustion chamber while also substantially deoxygenating the combustion chamber;

introducing biomass into the pyrolysis unit at a location proximate to both the second end of the combustion chamber and the first end of the inner pyrolysis chamber, in the presence of sufficient temperature and absence of oxygen to cause pyrolysis of the biomass to occur along the length of the inner pyrolysis chamber between the first and second ends thereof, and to further continue pyrolysis if necessary in the outer pyrolysis chamber between the first end and a second distal end thereof;

fitting a capturing and channeling means proximate to the second end of the outer pyrolysis chamber to effectuate removal of exhaust gases containing entrained matter resulting from pyrolytic reactions within the pyrolysis unit; and separating and collecting bio-fuel entrained in the exhaust gases.

2. The method recited in claim 1 wherein the separating and collecting bio-fuel step comprises:

separating and collecting entrained char from the exhaust gases that also contain entrained bio-oil vapor; and separating and collecting the entrained bio-oil vapor from the exhaust gases following separation of the entrained char from the exhaust gases.

3. The method recited in claim 2 further comprising the steps of:

channeling the separated char to a char bin for storage; and feeding a portion of the separated char from the char bin into the burn enclosure to subject the char to combustion of the admixture of air and fuel to produce additional heat and additional deoxygenation of the combustion chamber.

4. The method recited in claim 3 further comprising the steps of:

placing the biomass in a biomass feed bin; and then passing the exhaust gases separated from the entrained char and the entrained bio-oil vapor through the biomass in the biomass feed bin to filter out of the exhaust gases additional entrained matter; and then carrying out the step of introducing the biomass into the pyrolysis unit.

5. The method recited in claim 2 further comprising the step of channeling the separated char directly to the burn enclosure and subjecting the char to combustion of the admixture of air and fuel to produce additional heat and additional deoxygenation of the combustion chamber.

6. The method recited in claim 5 further comprising the steps of:

placing the biomass in a biomass feed bin; and then passing the exhaust gases separated from the entrained char and the entrained bio-oil vapor through the biomass in the biomass feed bin to filter out of the exhaust gases additional entrained matter; and then carrying out the step of introducing the biomass into the pyrolysis unit.

7. The method recited in claim 2 wherein the separating and collecting char step comprises the steps of:

providing a cyclone separator having a generally-enclosed body defining an open inside area in which is positioned a portion of an exhaust pipe for collecting and channeling the exhaust gases contained within the body, an inflow pipe for channeling into the body the hot exhaust gases containing entrained char, and means for circulating the exhaust gases containing the entrained char through the inflow pipe and within the body so as to separate the char from the exhaust gases, with the body also having a lower collection cone portion for collecting and distributing the separated char, and the inflow pipe spiraling downwardly around the exhaust pipe from proximate an upper portion of the exhaust pipe to a position above and proximate to the mouth of the collection cone portion of the body;

channeling the exhaust gases containing the entrained char into the inflow pipe of the cyclone separator; and then collecting and channeling the separated exhaust gases to the bio-oil condensing system.

8. The method recited in claim 7 wherein the providing a cyclone separator step further comprises:

the cyclone separator including a cooling duct for channeling a cooling medium to absorb heat from the hot exhaust gases and entrained char, the inflow pipe and the cooling duct positioned substantially parallel with each other and sharing a common wall to accommodate heat transfer between the two with the inflow pipe and the cooling duct spiraling downwardly together around the exhaust pipe from proximate the upper portion of the exhaust pipe to a position above and proximate to the mouth of the collection cone portion of the body; and channeling the cooling medium into the cooling duct to foster transfer of heat from the exhaust gases containing the entrained char to the cooling medium.

9. The method recited in claim 2 wherein the separating and collecting bio-oil step comprises passing the exhaust gases containing the entrained bio-oil vapor through a bio-oil condensing system to condense the bio-oil vapor and collecting the bio-oil condensate in a bio-oil storage tank.

10. The method recited in claim 1 wherein the providing a pyrolysis unit step further comprises the pyrolysis unit including at least one additional pyrolysis chamber, with all chambers, including the combustion chamber, arranged generally concentrically, where the combustion chamber is in communication with the innermost pyrolysis chamber, where the outermost pyrolysis chamber is in communication with the previous pyrolysis chamber, and where each pyrolysis chamber between the combustion chamber and the outermost pyrolysis chamber is in communication with both a previous chamber and a subsequent chamber.

11. A method for subjecting biomass to pyrolysis to extract bio-fuel therefrom, the method comprising the steps of:

providing a heat source for producing a directed, generally-deoxygenated, heated gas stream;

providing a pyrolysis unit having a combustion chamber, an inner pyrolysis chamber, and an outer pyrolysis chamber, the chambers arranged generally concentrically such that the combustion chamber is innermost substantially surrounded by the inner pyrolysis chamber which is substantially surrounded by the outer pyrolysis chamber, a first proximate end of the combustion chamber in communication with the heat source, and a second distal end of the combustion chamber in communication with a first proximate end of the inner pyrolysis chamber, and a second distal end of the inner pyrolysis chamber in communication with a first proximate end of the outer pyrolysis chamber;

introducing biomass into the pyrolysis unit at a location proximate to both the second end of the combustion chamber and the first end of the inner pyrolysis chamber, in the presence of sufficient temperature and absence of oxygen to cause pyrolysis of the biomass to occur along the length of the inner pyrolysis chamber between the first and second ends thereof, and to further continue pyrolysis if necessary in the outer pyrolysis chamber between the first end and a second distal end thereof;

fitting a capturing and channeling means proximate to the second end of the outer pyrolysis chamber to effectuate removal of exhaust gases containing entrained matter resulting from pyrolytic reactions within the pyrolysis unit; and separating and collecting bio-fuel entrained in the exhaust gases.

12. The method recited in claim 11 wherein the separating and collecting bio-fuel step comprises:

separating and collecting entrained char from the exhaust gases that also contain entrained bio-oil vapor; and separating and collecting the entrained bio-oil vapor from the exhaust gases following separation of the entrained char from the exhaust gases.

13. The method recited in claim 12 further comprising the steps of:

placing the biomass in a biomass feed bin; and then passing the exhaust gases separated from the entrained char and the entrained bio-oil vapor through the biomass in the biomass feed bin to filter out of the exhaust gases additional entrained matter; and then carrying out the step of introducing the biomass into the pyrolysis unit.

14. A method for subjecting biomass to pyrolysis to extract bio-fuel therefrom comprising:

providing a heat source for producing a directed, generally-deoxygenated heated gas stream;

providing a substantially enclosed pyrolysis unit including at least one pyrolysis chamber for pyrolyzing biomass and a combustion chamber for deoxygenating and channeling the heated gas stream to the pyrolysis chamber;

arranging the pyrolysis chamber and the combustion chamber concentrically and sharing a common heat-conducting wall such that the combustion chamber is located substantially within the pyrolysis chamber, a first proximate end of the combustion chamber fitted in communication with the heat source and a second distal end of the combustion chamber fitted in communication with a first proximate end of the pyrolysis chamber such that the directed, heated gas stream flows in a first direction through the combustion chamber exiting the second end thereof and entering the first end of the pyrolysis chamber, whereupon the gas stream flows in a second direction substantially opposite to that of the first direction along the length of the pyrolysis chamber between the first end and a second distal end thereof;

fitting the pyrolysis chamber of the pyrolysis unit in an inner pyrolysis chamber and providing the pyrolysis unit with an outer pyrolysis chamber for pyrolysizing the biomass, fitting the outer pyrolysis chamber generally concentrically with the combustion chamber and the inner pyrolysis chamber and sharing a common heat-conducting wall with the inner pyrolysis chamber such that the inner pyrolysis chamber is located substantially within the outer pyrolysis chamber with the second end of the inner pyrolysis chamber in communication with a first proximate end of the outer pyrolysis chamber such that the directed, heated gas stream flows in the second direction along the length of the inner pyrolysis chamber exiting the second end thereof and entering the first end of the outer pyrolysis chamber, so that the gas stream flows in substantially the first direction generally opposite to that of the second direction along the length of the outer pyrolysis chamber between the first end and a second distal end thereof;

introducing biomass into the pyrolysis unit at a location proximate to both the second end of the combustion chamber and the first end of the inner pyrolysis chamber, in the presence of sufficient temperature and the absence of oxygen to cause pyrolysis of the biomass to occur along the length of the pyrolysis unit;

capturing and channeling within the pyrolysis unit exhaust gases containing entrained matter resulting from pyrolytic reactions; and separating and collecting bio-fuel entrained in the exhaust gases from the pyrolysis unit.

15. The method recited in claim 14 further comprising the step of introducing the biomass into the pyrolysis unit at a location proximate to both the second end of the combustion chamber and the first end of the pyrolysis chamber.

16. The method recited in claim 15 further comprising the steps of providing the heat source with a burn enclosure for burning combustibles that are injected and ignited to produce the heated gas stream, fitting the burn enclosure with a rearward portion with an end from which the first end of the combustion chamber extends, and with which the first end of the combustion chamber is in communication, and providing an igniter for igniting the combustibles.

17. The method recited in claim 14 wherein the capturing and channeling step captures the exhaust gases proximate to the second end of the outer pyrolysis chamber.

18. The method recited in claim 17 wherein the step of separating and collecting bio-fuel comprises providing a bio-oil condensing system for cooling bio-oil vapor entrained in the exhaust gases to a condensing temperature and a bio-oil storage tank for collecting the bio-oil condensate.

19. The method recited in claim 18 wherein the step of separating and collecting bio-fuel further comprises the step of separating and collecting char entrained in the exhaust gases.

20. The method recited in claim 19 wherein the step of separating and collecting char comprises the steps of:

providing a cyclone separator having a generally-enclosed body defining an open inside area, an inflow pipe for channeling into the body the hot exhaust gases containing entrained char, a cooling duct for channeling a cooling medium to absorb heat from the hot exhaust gases, an exhaust pipe for collecting and channeling the exhaust gases contained within the body, and means for circulating the exhaust gases containing the entrained char through the inflow pipe and within the body so as to separate the char from the exhaust gases;

fitting the body with a lower collection cone portion for collecting and distributing the separated char, the collection cone portion including an upwardly facing mouth for collecting the char and an opposing open end for distributing the char;

positioning a portion of the exhaust pipe within the open inside area of the body, locating a first open end of the exhaust pipe above the collection cone portion of the body with a second opposing open end of the exhaust pipe extending above a top end of the body opposite the collection cone portion; and positioning the inflow pipe and the cooling duct substantially parallel with each other and sharing a common wall to accommodate heat transfer between the two, spiraling the inflow pipe and the cooling duct downwardly together around the exhaust pipe from a point proximate to the second open end of the exhaust pipe to a point above and proximate to the mouth of the collection cone portion of the body; and positioning the inflow pipe inwardly of the cooling duct such that a substantial portion of the inflow pipe and the cooling duct are within the body of the cyclone separator.

21. The method recited in claim 20 further comprising the step of channeling the collected char to the burn enclosure to be injected therein and ignited to contribute to the heated gas stream.

22. The method recited in claim 19 further comprising the step of channeling the collected char to the burn enclosure and injecting and igniting the char to further facilitate production of the heated gas stream.

23. The method recited in claim 16 wherein the step of separating and collecting bio-fuel further comprises the step of separating and collecting char entrained in the exhaust gases.

24. The method recited in claim 23 further comprising the step of channeling the collected char to the burn enclosure and injecting and igniting the char to further facilitate production the heated gas stream.

25. The method recited in claim 15 wherein the step of capturing and channeling means exhaust gases is carried out proximate to the second end of the pyrolysis chamber.

26. The method recited in claim 14 further comprising the steps of:

introducing biomass into the pyrolysis unit at a location proximate to both the second end of the combustion chamber and the first end of the inner pyrolysis chamber;

and capturing and channeling the exhaust gases proximate to the second end of the outer pyrolysis chamber.

27. The method recited in claim 23 wherein the steps of separating and collecting bio-fuel comprises providing a bio-oil condensing system for cooling bio-oil vapor entrained in the exhaust gases to a condensing temperature and a bio-oil storage tank for collecting the bio-oil condensate.

28. The method recited in claim 14 wherein the step of separating and collecting bio-fuel comprises the step of separating and collecting char entrained in the exhaust gases.

* * * * *